US011753026B2

(12) United States Patent
Ishibashi et al.

(10) Patent No.: US 11,753,026 B2
(45) Date of Patent: Sep. 12, 2023

(54) VEHICLE CONTROL DEVICE

(71) Applicants:Mazda Motor Corporation, Hiroshima (JP); NXP B.V., AG Eindhoven (NL)

(72) Inventors: Masato Ishibashi, Hiroshima (JP); Kiyoyuki Tsuchiyama, Hiroshima (JP); Daisuke Hamano, Hiroshima (JP); Tomotsugu Futa, Hiroshima (JP); Daisuke Horigome, Hiroshima (JP); Atsushi Tasaki, Hiroshima (JP); Yosuke Hashimoto, Hiroshima (JP); Yusuke Kihara, Hiroshima (JP); Eiichi Hojin, Hiroshima (JP); Arnaud Van Den Bossche, Munich (DE); Ray Marshall, Glasgow (GB); Leonardo Surico, Munich (DE)

(73) Assignees: MAZDA MOTOR CORPORATION, Hiroshima (JP); NXP B.V., AG Eindhoven (NL)

( * ) Notice: Subject to any disclaimer, the term of this patent is extended or adjusted under 35 U.S.C. 154(b) by 100 days.

(21) Appl. No.: 17/160,420

(22) Filed: Jan. 28, 2021

(65) Prior Publication Data

US 2021/0237727 A1 Aug. 5, 2021

(30) Foreign Application Priority Data

Feb. 5, 2020 (JP) .................. 2020-018116

(51) Int. Cl.
*B60W 50/06* (2006.01)
*B60W 30/14* (2006.01)
(Continued)

(52) U.S. Cl.
CPC ............ *B60W 50/06* (2013.01); *B60W 30/14* (2013.01); *G06V 10/811* (2022.01); *G06V 20/56* (2022.01);
(Continued)

(58) Field of Classification Search
CPC ................................................ B60W 50/0205
See application file for complete search history.

(56) References Cited

U.S. PATENT DOCUMENTS 8,095,816 B1 *  1/2012  Chan ..................... G06F 1/3287
                                                  710/56
2015/0367848 A1 * 12/2015  Terashima ........ B60W 30/0956
                                                  701/25
(Continued)

FOREIGN PATENT DOCUMENTS

JP    2017-47694 A    3/2017
JP    6289284 B2      3/2018
WO    2018/225225 A1  12/2018

OTHER PUBLICATIONS

Extended European search report dated Jul. 30, 2021, in corresponding European patent Application No. 21152303.0, 6 pages.

*Primary Examiner* — Imran K Mustafa
(74) *Attorney, Agent, or Firm* — XSENSUS LLP

(57) ABSTRACT

A vehicle control device includes a plurality of IC units, while maintaining the operational reliability. The vehicle control device includes an IC unit for performing image processing on outputs from cameras; an IC unit for performing recognition processing of an external environment of the vehicle; and an IC unit for performing judgment processing for cruise control of the vehicle. A control flow is provided so as to allow the IC unit to transmit a control signal to the IC units and. The control flow is provided separately from a data flow configured to transmit the output from the cameras, the image data, and the external environment data.

3 Claims, 6 Drawing Sheets

(51) Int. Cl.
*G06V 20/56* (2022.01)
*G06V 10/80* (2022.01)

(52) U.S. Cl.
CPC ..... *B60W 2420/42* (2013.01); *B60W 2555/00* (2020.02)

(56) References Cited

U.S. PATENT DOCUMENTS

| | | |
|---|---|---|
| 2018/0170374 A1 | 6/2018 | Otsuka et al. |
| 2020/0210726 A1* | 7/2020 | Yang .................. G06V 10/454 |
| 2020/0290641 A1 | 9/2020 | Kawakami |

* cited by examiner

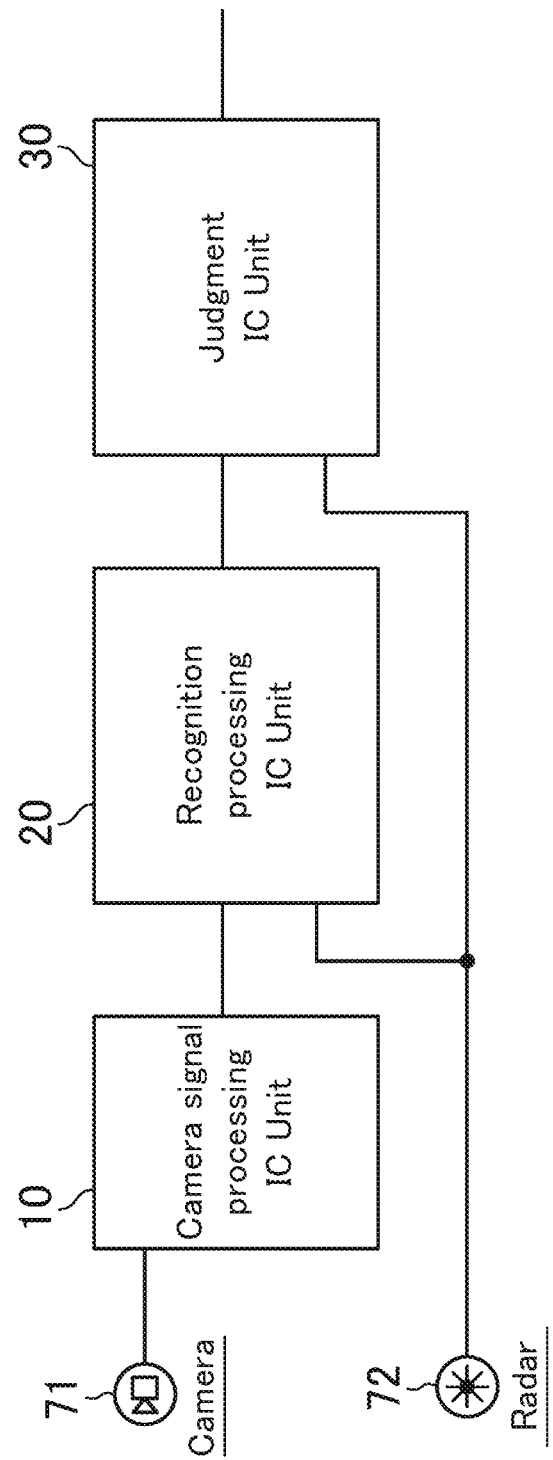

VEHICLE CONTROL DEVICE

CROSS-REFERENCE TO RELATED APPLICATION

This application claims priority to Japanese Patent Application No. 2020-018116 filed on Feb. 5, 2020, the entire disclosure of which is incorporated by reference herein.

BACKGROUND

The present disclosure relates to a vehicle control device used for autonomous driving of a motor vehicle, for example.

Patent Document 1 discloses an autonomous driving system with the following configuration. If an abnormality is detected in autonomous driving control information, a second control signal generated based on information on the own vehicle relative to a surrounding object is output to a drive device, instead of a first control signal generated based on the autonomous driving control information.

Patent Document 2 discloses a vehicle control device with the following configuration. Assume that an abnormality of any of a plurality of surrounding environment acquisition devices, a recognition/determination (engine control unit) ECU, and an integrated control ECU is detected. In this case, specific controls defining the operations to be executed by the surrounding environment acquisition devices, the recognition/determination ECU, and the integrated control ECU are sequentially switched and executed in accordance with the elapsed time after the detection of the abnormality.

Patent Document 3 discloses a semiconductor device, for vehicle control, including a recognizer, a route calculator, and a mode controller. The recognizer recognizes objects around a vehicle. The route calculator calculates the cruise route of the vehicle in an automatic control mode based on the recognized objects. The mode controller shifts the mode from the automatic control mode to a manual control mode, if no cruise route avoiding the recognized objects is calculated.

Patent Document 1: Japanese Unexamined Patent Publication No. 2017-47694
Patent Document 2: International Publication No. WO 2018/225225
Patent Document 3: Japanese Patent No. 6289284

SUMMARY

In recent years, development of autonomous driving systems has been promoted nationally. In general, in an autonomous driving system, a camera, for example, obtains the information on the environment outside a vehicle, and an arithmetic logic unit (ALU) calculates the route to be traveled by the vehicle based on the obtained information on the environment outside the vehicle. Based on a result of this calculation, various actuators mounted in the vehicle are controlled. The ALU receives sensor signals from various sensors mounted in the vehicle.

Here, for example, a vehicle control device used for autonomous driving needs to perform high-speed processing on a large number of data such as video data obtained by the camera to recognize the environment outside the vehicle, and calculate the route to be traveled by the vehicle in real time. The vehicle control device is thus supposed to include a plurality of integrated circuit (IC) units. In a vehicle control device including a plurality of IC units, however, synchronization among these IC units may be difficult and the communications among the IC units may increase the times for processing. This may reduce the operational reliability of the vehicle control device.

The present disclosure was made in view of the problems. It is an objective of the present disclosure to provide a vehicle control device including a plurality of IC units, while maintaining the operational reliability.

In order to solve the problems, the present disclosure is directed to an electric motor vehicle including: a first integrated circuit (IC) unit for receiving an output from a camera mounted in a vehicle, performing image processing on the output from the camera, and outputting image data obtained through the image processing; a second IC unit for receiving the image data output from the first IC unit, performing recognition processing of an external environment of the vehicle based on the image data, and outputting external environment data obtained through the recognition processing; and a third IC unit for receiving the external environmental data output from the second IC unit, and performing judgment processing for cruise control of the vehicle based on the external environment data. A control flow is provided so as to allow the third IC unit to transmit a control signal to the first and second IC units. The control flow is provided separately from a data flow configured to transmit the output from the camera, the image data output from the first IC unit, and the external environment data output from the second IC.

In this configuration, the electric motor vehicle includes: the first IC unit for performing the image processing on the output from the camera mounted in the vehicle; the second IC unit for performing the recognition processing of the external environment of the vehicle based on the image data output from the first IC unit; and the third IC unit for performing the judgment processing for the cruise control of the vehicle based on the external environment data output from the second IC unit. The control flow is provided so as to allow the third IC unit to transmit the control signal to the first and second IC units. The control flow is provided separately from the data flow required to transmit a large amount of data including the output from the camera, the image data, and the external environment data. This configuration facilitates synchronization among the first to third IC units, and dynamic change and suspension of the processing by the first to third IC units. Accordingly, the vehicle control device maintains the operational reliability.

In the vehicle control device, each of the first to third IC units may include a memory for storing a program for performing the processing. Each of the first and second IC units may read out the program from the memory according to the control signal received from the third IC unit through the control flow, and perform the processing.

In this configuration, each of the first and second IC units reads out the program from the memory according to the control signal received from the third IC unit through the control flow, and performs the processing. This configuration reduces the activation time and quickly responds to a change in the operation mode through the control flow.

The vehicle control device may further include: a non-volatile shared-memory for storing a program for performing the processing by the first to third IC units. At boot time of the vehicle control device, the program for performing the processing by the first to third IC units may be transmitted from the non-volatile shared-memory to the memory of each of the first to third IC units.

In this configuration, at the boot time of the vehicle control device, the program for performing the processing by the first to third IC units is transmitted from the non-volatile shared-memory to the memory of each of the first to third IC units. This configuration reduces the number of memories, and thus reduces an increase in the power consumption and the amount of generated heat, for example.

The present disclosure provides a vehicle control device including a plurality of IC units, while maintaining the operational reliability.

BRIEF DESCRIPTION OF THE DRAWINGS

FIG. 1 is a block diagram showing an example configuration of a vehicle control device.

DETAILED DESCRIPTION

An exemplary embodiment will now be described in detail with reference to the drawings.

FIG. 1 is a block diagram showing an example configuration of a vehicle control device. The vehicle control device shown in FIG. 1 includes three units of a signal processing integrated circuit (IC) unit 10, a recognition processing IC unit 20, and a judgment processing IC unit 30. Although not shown in detail, the signal processing IC unit 10, the recognition processing IC unit 20, and the judgment processing IC unit 30 are stored in a single housing placed in a specific location inside a vehicle such as under a seat or in a trunk. Each of the signal processing IC unit 10, the recognition processing IC unit 20, and the judgment processing IC unit 30 may be a single IC chip or may include a plurality of IC chips. In addition, each IC chip may include a single core or die, or a plurality of cores or dies in cooperation with each other. The core includes, for example, a CPU, and a memory for temporarily storing programs for operating the CPU, the results of the processing by the CPU, or other data.

The signal processing IC unit 10 performs image processing of imaging signals received from cameras 71 that image the environment outside the vehicle. The cameras 71 are arranged, for example, to image the surroundings of the motor vehicle at 360° in the horizontal direction. The imaging data of the cameras 71 is aggregated in the signal processing IC unit 10. The signal processing IC unit 10 performs the image processing on the aggregated imaging data, and outputs the processed data, as the image processing data, to the recognition processing IC unit 20. The cameras 71 are example imaging devices that image the environment outside the vehicle.

The recognition processing IC unit 20 receives the image processing data output from the signal processing IC unit 10, and estimates the environment outside the vehicle including the road and obstacles based on the image processing data utilizing deep learning. In the deep learning, a multi-layer neural network (e.g., a deep neural network (DNN)) is used, for example. The multi-layer neural network may be a convolutional neural network (CNN), for example.

The recognition processing IC unit 20 generates at least one route candidate avoiding the obstacles on the road based on the estimated environment outside the vehicle, and outputs the generated route candidate as route candidate data.

The judgment processing IC unit 30 receives the route candidate data output from the recognition processing IC unit 20, and determines a cruise route of the motor vehicle based on the route candidate data. In addition, the judgment processing IC unit 30 determines the target motion of the motor vehicle when traveling along the determined cruise route. After that, the judgment processing IC unit 30 calculates the driving force, the braking force, and the steering angle for achieving the determined target motion.

1. Functional Configuration

Figure 2A:
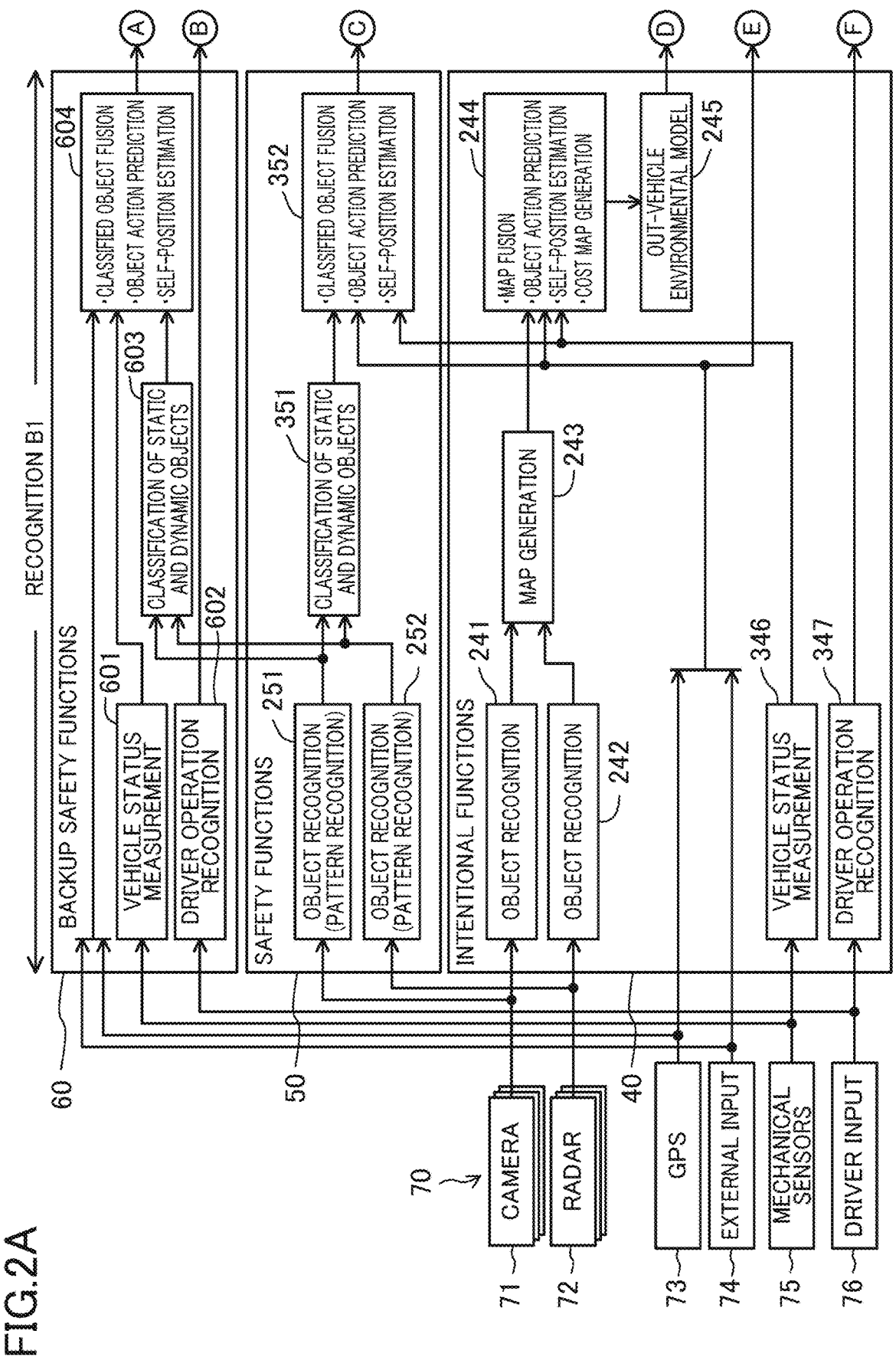
FIG. 2A is a block diagram showing an example functional configuration of the vehicle control device.
Figure 2B:
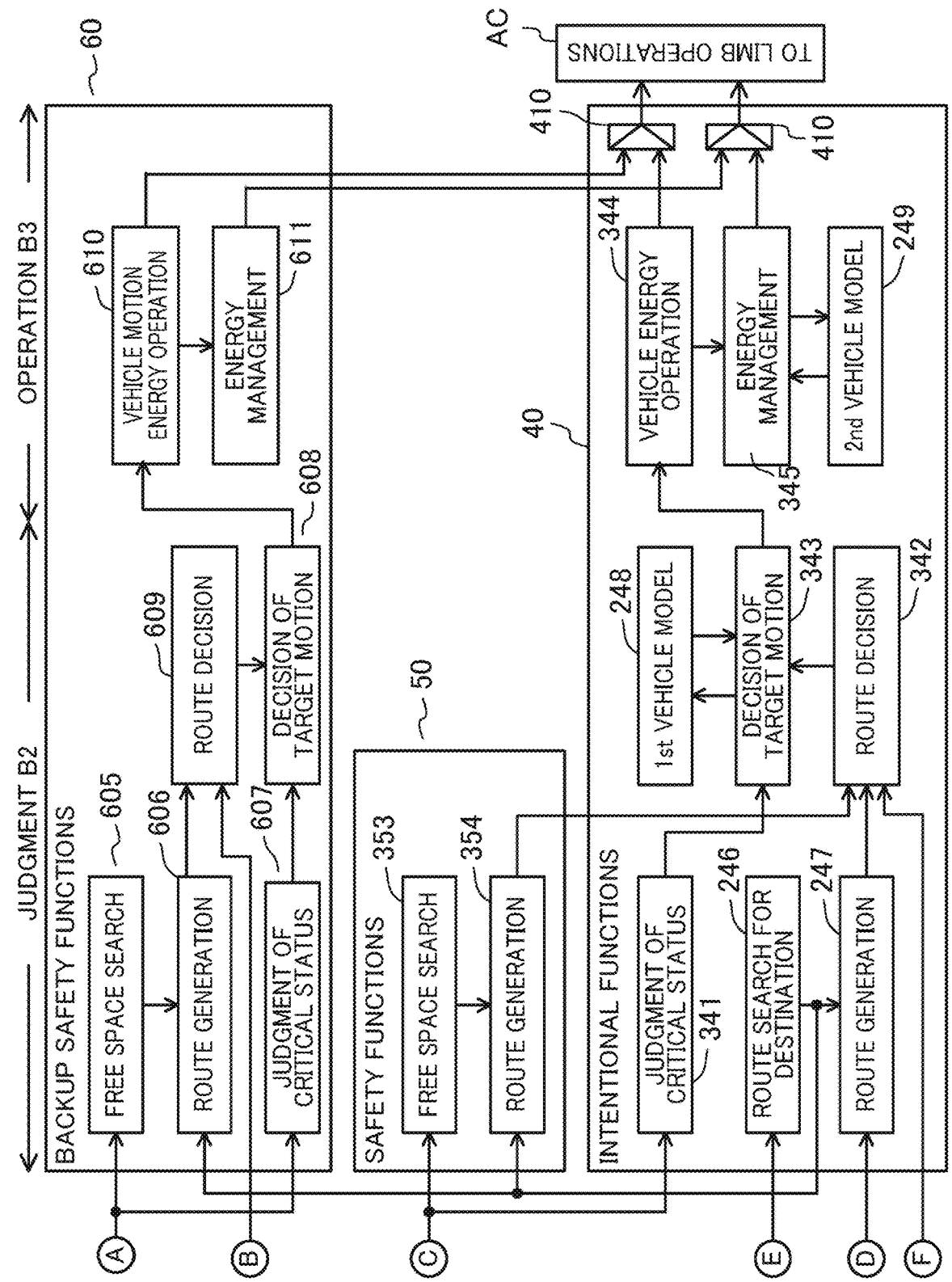
FIG. 2B is another block diagram showing the example functional configuration of the vehicle control device.

FIGS. 2A and 2B are block diagrams showing an example functional configuration of the vehicle control device. In the following description, FIGS. 2A and 2B may be collectively referred to as "FIG. 2".

The configuration shown in FIG. 2 is divided into a recognition system block B1, a judgment system block B2, and an operation system block B3. The recognition system block B1 is for recognizing the environment outside and inside the vehicle (including the conditions of the driver). The judgment system block B2 is for determining various conditions and situations based on the results of the recognition by the recognition system block B1 to determine the operation of the motor vehicle. The operation system block B3 is for generating, based on the determination by the judgment system block B2, signals and data to be specifically transmitted to the actuators.

In addition, the vehicle control device includes (1) a main arithmetic unit 40, (2) a safety function unit 50, and (3) a backup safety IC unit 60. The main arithmetic unit 40 includes the recognition system block B1, the judgment system block B2, and the operation system block B3 for achieving the autonomous driving in a normal operation. The safety function unit 50 functions to complement the recognition system block B1 and the judgment system block B2 of the main arithmetic unit 40 mainly. The backup safety IC unit 60 moves the motor vehicle to a safe position under abnormal circumstances such as a malfunction of the main arithmetic unit 40 or the safety function unit 50.

In the vehicle control device, the recognition system block B1 and the judgment system block B2 of the main arithmetic unit 40 execute the processing utilizing various models constructed by the deep learning utilizing the neural network. The processing using such models allows driving control based on comprehensive determination on the vehicle status, the environment outside the vehicle, or the conditions of the driver, that is, control of a large amount of input information in cooperation in real time. On the other hand, as described above, the recognition of the environment outside the vehicle and the calculation of the route utilizing the deep learning are still developing and believed to remain at the automotive safety integrity level (ASIL)-B.

To address the problem, the vehicle control device assumes that determination or processing (hereinafter simply referred to as "deviating processing") deviating from a specific acceptable range derives from the deep learning executed by the main arithmetic unit 40, and thus monitors such the deviating processing. Upon detection of the deviating processing, this vehicle control device replaces the processing with determination or processing by the safety function unit 50 that achieves a functional safety level corresponding to the ASIL-D or allows the reprocessing by the main arithmetic unit 40.

Specifically, for example, the safety function unit 50 is configured to:

(1) recognize an object (referred to as a "target" in the present disclosure) outside the vehicle by an object recognition method typically employed by motor vehicles, for example; and (2) set a safe area safely passed by the vehicle through a method typically employed by motor vehicles, for example to set the route passing through the safe area as the cruise route to be passed by the motor vehicle.

What is called the "rule-based" determination or processing provides the functional safety level corresponding to the ASIL-D.

In the vehicle control device, the main arithmetic unit 40 and the safety function unit 50 proceed the same-purpose processing (e.g., route generation) in parallel based on the same input information (including information acquired by the information acquisition unit 70, which will be described later). This configuration allows monitoring of the deviating processing that derives from the main arithmetic unit 40, the employment of the determination or processing by the safety function unit 50, or the re-calculation by the main arithmetic unit 40 as necessary.

The vehicle control device further includes the backup safety IC unit 60 to cope with malfunctions of both the main arithmetic unit 40 and the safety function unit 50. The backup safety IC unit 60 is prepared as a separate configuration from the main arithmetic unit 40 and the safety function unit 50 to function to generate the route by a rule-based approach based on the information on the outside of the vehicle and execute the vehicle control until the vehicle parks at a safe position.

The vehicle control device receives, as input signals, the data acquired by the information acquisition unit 70 that acquires the information on the environment inside and outside the vehicle. As the signals input to the vehicle control device, the information may be input from a system or a service connected to an external network (e.g., the internet) such as the cloud computing (referred to as "EXTERNAL INPUT" in FIG. 2).

Examples of the information acquisition unit 70 include (1) the plurality of cameras 71, (2) a plurality of radars 72, (3) a position sensor 73 including a positioning system such as a global positioning system (GPS), (4) the external input 74 from the network outside the vehicle, (5) a mechanical sensor 75 such as a vehicle speed sensor, and (6) a driver input 76. The driver input 76 includes an accelerator position sensor, a steering angle sensor, a brake sensor, for example. The driver input 76 also includes sensors that detect the operation by the driver on various targets to be operated, such as an accelerator pedal, a brake pedal, a steering, and various switches, for example.

1-1. Main Arithmetic Unit (1)

Here, the configuration of the main arithmetic unit 40 will be described using an example of the route generation by the main arithmetic unit 40 using the deep learning.

As shown in FIG. 2, the main arithmetic unit 40 includes object recognizers 241 and 242 that recognize objects outside the vehicle, a map generator 243, an out-of-vehicle environment estimator 244, an out-of-vehicle environment model 245, a route searcher 246, and a route generator 247.

The object recognizer 241 receives images (including videos) outside the vehicle captured by the cameras 71, and recognizes objects outside the vehicle based on the received images. The object recognizer 241 includes a signal processor 241a (see FIG. 3) and a recognizer 241b (see FIG. 3). The image processor 241a receives the images captured by the cameras 71 and performs image processing. The recognizer 241b recognizes the objects outside the vehicle based on the images processed by the image processor 241a. The object recognizer 242 recognizes the objects outside the vehicle based on a peak list of reflected waves detected by the radars 72. The object recognizers 241 and 242 may employ typically known object recognition techniques based on images or radio waves.

The results of the recognition by the object recognizers 241 and 242 are transmitted to the map generator 243. The map generator 243 performs the processing for dividing the surroundings of the own vehicle into a plurality of areas (e.g., front, right, left, and rear areas) and creating respective maps of the areas. Specifically, the map generator 243 integrates, for each area, the object information recognized by the cameras 71 and the object information recognized by the radars 72, and reflects the integrated information to the map.

The map generated by the map generator 243 is used to estimate the environment outside the vehicle by the out-of-vehicle environment estimator 244 in the image recognition processing using the deep learning. Specifically, the out-of-vehicle environment estimator 244 creates a 3D map representing the environment outside the vehicle through the image recognition processing based on the environment model 245 constructed utilizing the deep learning. In the deep learning, a multi-layer neural network (e.g., a deep neural network (DNN) is used. The multi-layer neural network may be a convolutional neural network (CNN), for example.

More specifically, the out-of-vehicle environment estimator 244 (1) combines the maps for the areas, and generates the integrated map representing the surroundings of the own vehicle, (2) estimates the displacements of the distances, directions, and relative speeds of moving objects within the integrated map with respect to the own vehicle, and (3) incorporates the result into the out-of-vehicle environment model 245. In addition, the out-of-vehicle environment estimator 244 (4) estimates the position of the own vehicle on the integrated map based on a combination of highly accurate map information taken from the inside or outside of the vehicle, the position, vehicle speed, and six-axis information obtained by the GPS or, for example, and (5) calculates the costs for the route described above, and (6) incorporates the result into the out-of-vehicle environment model 245 together with the motion information of the own vehicle obtained by the various sensors. Through the processing, the out-of-vehicle environment estimator 244 frequently updates the out-of-vehicle environment model 245 and uses the updated model for the route generation by the route generator 247, which will be described later.

The signals of the positioning system such as the GPS and the data, for example, for car navigation transmitted from the network outside the vehicle are transmitted to the route searcher 246. The route searcher 246 searches for a wide-area route of the vehicle using the signals of the positioning system such as the GPS or the data, for example, for the navigation transmitted from the network outside the vehicle.

The route generator 247 generates the cruise route of the vehicle based on the out-of-vehicle environment model 245 described above and the output from the route searcher 246. The cruise route is generated as follows. For example, the safety, the fuel efficiency, and other factors are scored and at least one cruise route with the lowest scores is generated. The route generator 247 may generate a cruise route based on a plurality of viewpoints, such as the cruise route adjusted in accordance with the cruise route described above and the amount of operation by the driver.

1-2. Safety Function Unit

Here, the configuration of the safety function unit 50 will be described using an example of the rule-based route generation by the safety function unit 50.

As shown in FIG. 2, the safety function unit 50 includes object recognizers 251 and 252 that recognize the patterns of objects outside the vehicle, a classifier 351, a preprocessor 352, a free space searcher 353, and a route generator 354.

The object recognizer 251 receives images (including videos) outside the vehicle captured by the cameras 71, and recognizes the objects outside the vehicle based on the received images. The object recognizer 251 includes a signal processor 251*a* (see FIG. 3) and a recognizer 251*b* (see FIG. 3). The image processor 251*a* receives the images captured by the cameras 71 and performs image processing. The recognizer 251*b* recognizes the objects outside the vehicle based on the images processed by the image processor 251*a*. The object recognizer 252 recognizes the objects outside the vehicle based on a peak list of reflected waves detected by the radars 72.

The classifier 351 receives the results of the objects by the object recognizer 252, and classifies the recognized objects into moving objects and stationary objects. The classifier 351 divides the surroundings of the own vehicle into a plurality of areas (e.g., front, right, left, and rear areas), (2) integrates, for each area, the object information recognized by the cameras 71 and the object information recognized by the radars 72, and (3) generates, for each area, classification information on the moving and stationary objects.

The preprocessor 352 integrates the classification results for each area generated by the classifier 351. The integrated information is managed, for example, on a grid map (not shown) as the classification information between the moving and stationary objects around the own vehicle. In addition, the distances, directions, and relative speeds of the moving objects with respect to the own vehicle are estimated. The results are incorporated as additional information to the moving objects. In addition, the preprocessor 352 estimates the position of the own vehicle relative to the moving and stationary objects based on a combination of highly accurate map information, the position, vehicle speed, and six-axis information obtained from the inside or outside of the vehicle.

The free space searcher 353 searches for a free space avoiding a collision with a moving or stationary object (hereinafter, also referred to as a "target") whose position has been estimated by the preprocessor 352. For example, the free space searcher 353 is set based on a predetermined rule. For example, the area of several meters around the target is considered as an "unavoidable range". If the target is a moving object, the free space searcher 353 sets the free space, taking the moving speed into consideration. The free space is, for example, an area without any dynamic obstacle such as another vehicle or a pedestrian, or any static obstacle such as a median strip or a center pole on a road. The free space may include a space on a road shoulder allowing emergency parking.

The route generator 354 calculates a route passing through the free space searched by the free space searcher 353. How the route generator 354 calculates a route is not particularly limited. However, for example, a plurality of routes passing through the free space are generated, and the one requiring the lowest costs is selected from the plurality of routes. The route calculated by the route generator 354 is output to a target motion determiner 343, which will be described later.

Note that the function of the safety function unit 50 described above is obtained by applying, to a rule-based approach, the recognition method and the avoidance method of an object, for example, which have been typically employed by motor vehicles, for example. The function is at a functional safety level corresponding to the ASIL-D, for example.

1-3. Main Arithmetic Unit (2)

In addition to the blocks described in "1-1. Main Arithmetic Unit (1)", the main arithmetic unit 40 includes a critical status determiner 341, a first vehicle model 248, a second vehicle model 249, a route determiner 342, a target motion determiner 343, a vehicle kinetic energy setter 344, an energy management 345, and selectors 410 and 420.

Upon determination that there is a possibility of a collision with an object or a deviation of the lane based on the out-of-vehicle environment model 245, the critical status determiner 341 sets a cruise route (e.g., the target position and vehicle speed) for avoiding the collision or the deviation.

The route determiner 342 determines the cruise route of the vehicle based on the cruise route set by the route generator 247, the cruise route set by the route generator 354 of the safety function unit 50, and the amount of operation by the driver. How to determine the cruise route is not particularly limited. For example, the cruise route set by the route generator 247 may have the top priority in normal driving. In addition, if the cruise route set by the route generator 247 does not pass through the free space searched by the free space searcher 353, the cruise route set by the route generator 354 of the safety function unit 50 may be selected. The selected cruise route may be adjusted in accordance with the amount or direction of operation by the driver, or the operation by the driver may have the priority.

The target motion determiner 343 determines, for example, the six-axis target motion (e.g., the acceleration or the angular velocity) of the cruise route determined by the route determiner 342. The target motion determiner 343 may use a predetermined first vehicle model 248 in the determination on the six-axis target motion. The first vehicle model 248 is obtained by modeling the six-axis motion status (e.g., the acceleration or the angular velocity) set for each vehicle, for example. The first vehicle model 248 is generated based on, for example, the basic motor functions of the vehicle set in advance or the environment information inside and outside of the vehicle, and is updated as appropriate.

The vehicle kinetic energy setter 344 calculates the torques required for the drive system, the steering system, and the braking system with respect to the six-axis motion target motion determined by the target motion determiner 343. The drive system includes an engine system, a motor, and a transmission, for example. The steering system includes a steering wheel, for example. The braking system includes a brake, for example.

The energy management 345 calculates the amount of control of the actuators AC at the highest energy efficiency to achieve the target motion determined by the target motion determiner 343. Specifically, the energy management 345 calculates the opening/closing timing of intake/exhaust valves (not shown) and the timing of injectors (not shown) injecting the fuel at the most improved fuel efficiency to achieve the engine torque determined by the target motion determiner 343. The actuators AC include the engine system, the brake, the steering, and the transmission, for example. The energy management 345 may use the predetermined second vehicle model 249 to manage the energy. The second vehicle model 249 is obtained by modeling the plant conditions (e.g., the torque, the power, or the heat amount) at present or at a predetermined specified time, for example. The second vehicle model 249 is generated during the travel of the vehicle, for example, and is updated as appropriate.

The selector 410 receives the control signals output from the main arithmetic unit 40 and the backup control signals output from the backup safety IC unit 60. In a normal operation, the selector 410 selects and outputs the control signals output from the main arithmetic unit 40. On the other hand, upon detection of a malfunction of the main arithmetic unit 40, the selector 410 selects and outputs the backup control signals output from the backup safety IC unit 60.

2. Example Configurations of IC Units

Figure 3:
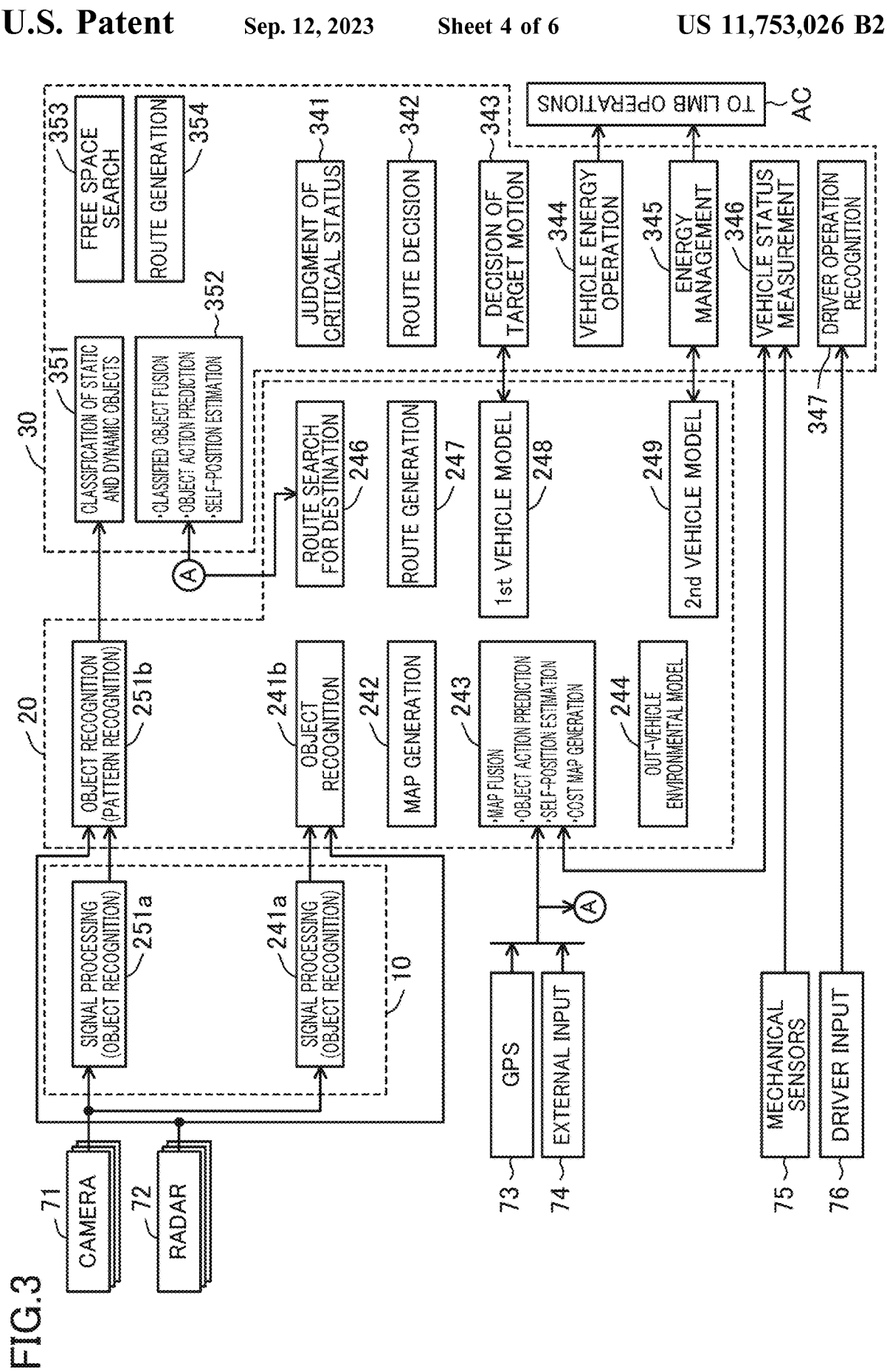
FIG. 3 is a block diagram showing example configurations of IC units.

FIG. 3 is a block diagram showing example configurations of the IC units in the vehicle control device. In FIG. 3, the same reference characters are used to represents the blocks corresponding to those in FIG. 2. The example configurations shown in FIG. 3 are mere examples. The functional blocks included in each IC unit are not limited to those shown in FIG. 3.

In the example configuration shown in FIG. 3, the signal processing IC unit 10 includes the image processor 241*a* included in the object recognizer 241 in the main arithmetic unit 40 and the image processor 251*a* included in the object recognizer 251 in the safety function unit 50. The recognition processing IC unit 20 includes the recognizer 241*b* included in the object recognizer 241 in the main calculation unit 40, the recognizer 251*b* included in the object recognizer 251 in the safety function unit 50, as well as the object recognizer 242, the map generator 243, the out-of-vehicle environment estimator 244, the route searcher 246, the route generator 247, the first vehicle model 248, and the second vehicle model 249 in the main arithmetic unit 40. The judgment processing IC unit 30 includes the determiner 341, the route determiner 342, the target motion determiner 343, the vehicle kinetic energy setter 344, the energy management 345, the vehicle status determiner 346, and the driver operation recognizer 347 in the main arithmetic unit 40 as well as the classifier 351, the preprocessor 352, the free space searcher 353, and the route generator 354 in the safety function unit 50.

(Embodiment)

Figure 4:
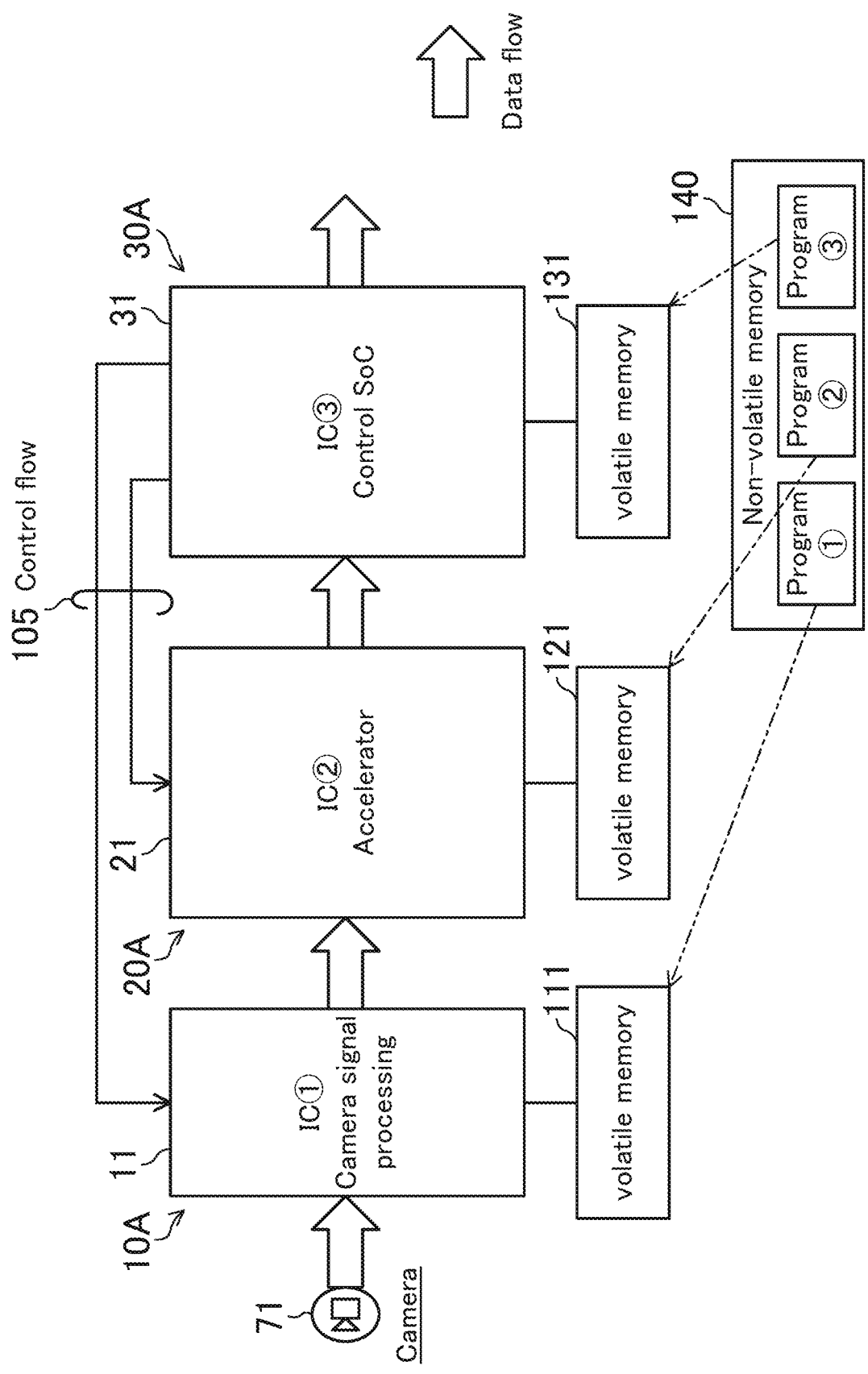
FIG. 4 is an image diagram of an example configuration of a vehicle control device according to an embodiment.

FIG. 4 is an image diagram of an example configuration of a vehicle control device according to an embodiment. Like the configuration described above, the vehicle control device shown in FIG. 4 includes three IC units. Specifically, the vehicle control device in FIG. 4 includes first, second, and third integrated circuit (IC) units 10A, 20A, and 30A. The first IC unit 10A receives an output from a camera 101 mounted in a vehicle and performs signal processing for image processing on the output from the camera. The second IC unit 20A receives the image data output from the first IC unit 10A and performs recognition processing of an external environment of the vehicle based on the image data. The third IC unit 30A receives the external environmental data output from the second IC unit 20A, and performs judgment processing for cruise control of the vehicle based on the external environment data. The first, second, and third IC units 10A, 20A, and 30A have the same functional configurations as those of the signal processing IC unit 10, the recognition processing IC unit 20, and the judgment processing IC unit 30 described above, respectively. In FIG. 4, the information acquisition unit 70 other than the cameras 71 is not shown.

The first IC unit 10A includes an IC chip 11 for camera signal processing, and a volatile memory 111 storing programs and data for the IC chip 11 to execute the processing. The second IC unit 20A includes an IC chip 21 for arithmetic processing utilizing the deep learning, and a volatile memory 121 storing programs and data for the IC chip 21 to execute the processing. The third IC unit 30A includes an IC chip 31 for processing such as route generation or control parameters of on-vehicle devices, and a volatile memory 131 storing programs and data for the IC chip 31 to execute the processing.

Note that each of the IC chips 11, 21, and 31 may be a single chip or may include a plurality of chips. The memories 111, 121, and 131 may be inside or outside the associated IC chips. Alternatively, each memory may be located on the same substrate as the associated IC chip, or may be on another substrate.

The vehicle control device of FIG. 4 includes a non-volatile shared-memory 140. The non-volatile shared-memory 140 stores programs for the first to third IC chips 11, 21, and 31 to execute the processing. At a boot time of the vehicle control device, the programs for the first to third IC chips 11, 21, and 31 to execute the processing are transferred from the non-volatile shared-memory 140 to the volatile memories 111, 121, and 131, respectively. In the 3-unit configuration as shown in FIG. 4, the second IC chip 21 is changed to improve the performance following the technological advancement of rapid recognition system processing using the artificial intelligence (AI), for example. The first IC chip 11 may be changed so that the device is applicable to sensor configurations that vary depending on the type, the grade, or the destination of the vehicle.

In the configuration of FIG. 4, the outputs from the cameras 71 are transmitted to the first IC unit 10A, the image data output from the first IC unit 10A is transmitted to the second IC unit 20A, the external environment data output from the second IC unit 20A is transmitted to the third IC unit 30A, and the control parameters output from the third IC unit 30A are transmitted to the on-vehicle devices. That is, in the configuration of FIG. 4, the data flow is provided for transmitting the outputs from the cameras 71 and the first to third IC units 10A, 20A, and 30A. This data flow needs to transmit a large amount of data including the outputs from the cameras, the image data, and the external environment data.

On the other hand, in the configuration of FIG. 4, the third IC unit 30A transmits the control signals to the first and second IC units 10A and 20A. The third IC unit 30A functions as a centralized management in the vehicle control device, and controls, as a master chip, the first and second IC units 10A and 20A as slave chips. Specifically, a control flow 105 is provided for transmitting the control signals output from the third IC unit 30A to the first and second IC units 10A and 20A. This control flow 105 is provided separately from the data flow. The control signals transmitted from the second IC unit 30A through the control flow 105 are for instructions on the processing, and are for providing the first and third IC units 10A and 20A with triggers for executing the programs stored in the memories 111 and 121.

The third IC unit 30A may control the first IC unit 10A as follows, for example. For example, the operation mode (e.g., the resolution or frame frequency) of the camera signal processing is indicated in accordance with the driving conditions (e.g., driving at a low speed, in a city, or at a high speed) of the vehicle. Alternatively, a camera to be subjected to the signal processing is identified based on the traveling direction (e.g., the forward or backward direction) of the vehicle.

On the other hand, the third IC unit 30A may control the second IC unit 20A as follows, for example. For example, a plurality of operation modes with different power consumption are prepared for the recognition system processing. In accordance with the power conditions (e.g., the state of charge (SoC) of the battery, the power consumption of the other devices such as the air conditioner) of the vehicle, the operation mode is indicated. Alternatively, the operation mode of the recognition system processing is indicated in accordance with the driving conditions (e.g., driving at a low speed, in a city, or at a high speed) of the vehicle.

Here, if the control flow is common to the data flow, the following problem occurs. In this case, the second IC unit 20A controls, as a master chip, the first IC unit 10A as the slave chip through the data flow, whereas the third IC unit 30A controls, as a master chip, the second IC unit 20A as the slave chip through the data flow. In this case, since the third IC unit 30A does not directly grasp the conditions of the first IC unit 10A, the synchronization among the first to third IC units 10A, 20A, and 30A is difficult. The communications among the IC units may increase the times for processing. This may reduce the operational reliability of the vehicle control device.

By contrast, in this embodiment, the control flow 105 is provided to allow the third IC unit 30A to transmit the control signals to the first and second IC units 10A and 20A. This control flow 105 is provided separately from the data flow for transmitting the outputs from the cameras 71 and the first to third IC units 10A, 20A, and 30A. This facilitates the synchronization among the first to third IC units 10A, 20A, and 30A, and facilitates the dynamic change or suspension of the processing of the first to third IC units 10A, 20A, and 30A. Accordingly, the vehicle control device maintains the operational reliability.

In addition, in this embodiment, the programs for the IC units 10A, 20A, and 30A to execute the processing are distributed into the respective memories 111, 121, and 131 included in the units. Then, the first and second IC units 10A and 20A read out the programs from the memories 111 and 121 in accordance with the control signals received from the third IC unit 30A through the control flow 105, and execute the processing. This configuration reduces the activation time and quickly responds to a change in the operation mode through the control flow.

The programs for the IC units 10A, 20A, and 30A to execute the processing are stored in the non-volatile shared-memory 140. At the boot time of the vehicle control device, the programs for the IC units to execute the processing are transferred from the non-volatile shared-memory 140 to the respective volatile memories 111, 121, and 131. This configuration reduces the number of memories, and thus reduces an increase in the power consumption and the amount of generated heat, for example.

Figure 5:
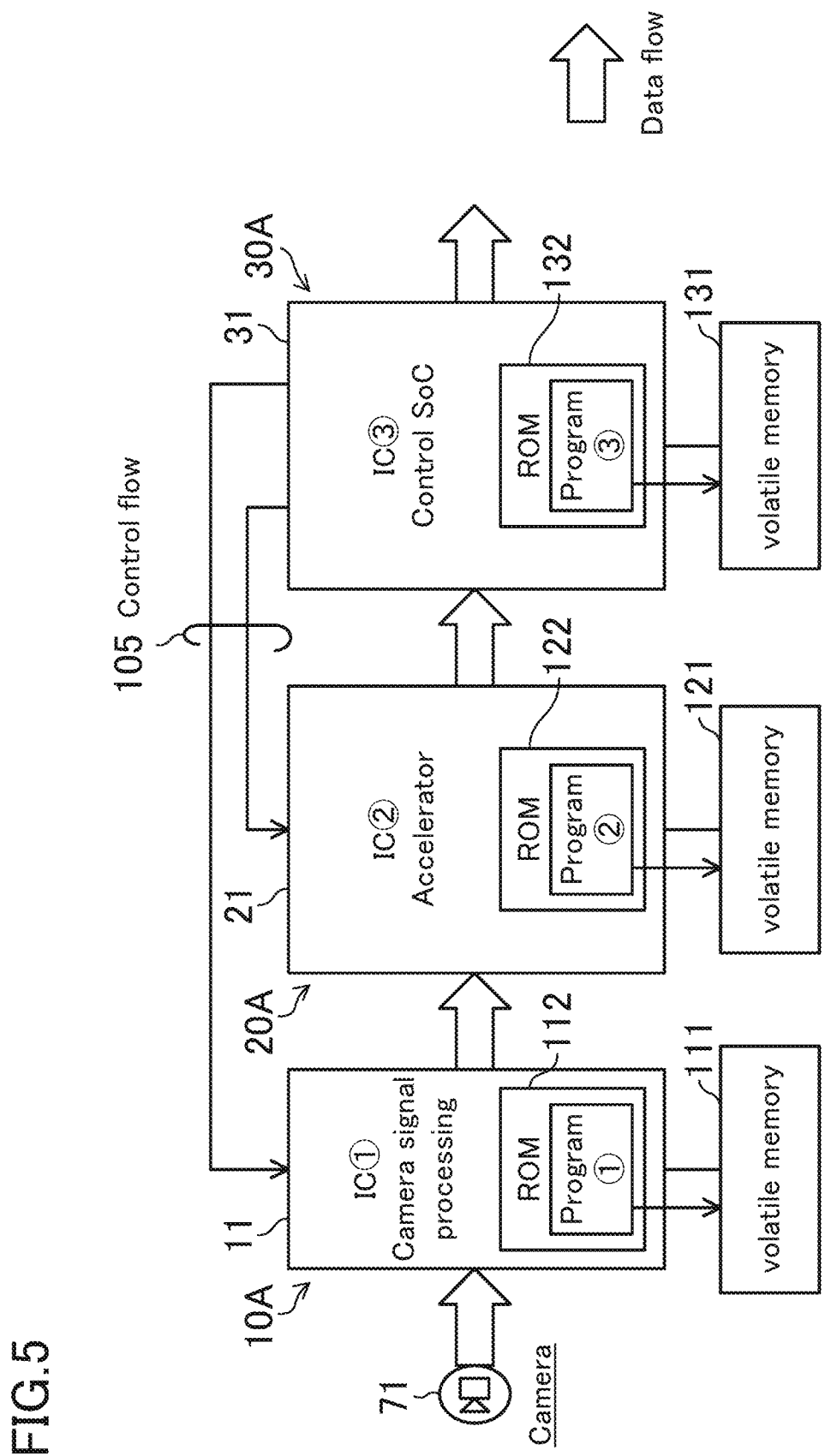
FIG. 5 is an image diagram of another example configuration of the vehicle control device according to the embodiment.

FIG. 5 is an image diagram of another example configuration of the vehicle control device according to the embodiment. Like the configuration described above, the vehicle control device shown in FIG. 5 includes three IC units. However, the IC chip 11 of the first IC unit 10A, the IC chip 21 of the second IC unit 20A, and the IC chip 31 of the third IC unit 30A include read only memories (ROMs) 112, 122, and 132, respectively, storing programs for the IC units to perform the processing. On the other hand, in the configuration of the vehicle control device, the non-volatile shared-memory 140 is omitted.

The configuration of FIG. 5 provides the same advantages as the configuration of FIG. 4. Specifically, the control flow 105 is provided to allow the third IC unit 30A to transmit the control signals to the first and second IC units 10A and 20A. This control flow 105 is provided separately from the data flow for transmitting the outputs from the cameras 71 and the first to third IC units 10A, 20A, and 30A. This facilitates the synchronization among the first to third IC units 10A, 20A, and 30A. In addition, this configuration facilitates the dynamic change or suspension of the processing of the first to third IC units 10A, 20A, and 30A. Accordingly, the vehicle control device maintains the operational reliability.

In the configuration of FIG. 5, at the boot time of the vehicle control device, the programs for the IC units to execute the processing are transferred from the ROMs 112, 122, and 132 to the respective volatile memories 111, 121, and 131. This configuration reduces the number of memories, and thus reduces an increase in the power consumption and the amount of generated heat, for example.

The embodiments described above are merely examples in nature, and the scope of present disclosure should not be interpreted in a limited manner. The scope of the present disclosure is defined by the appended claims, and all variations and modifications belonging to a range equivalent to the range of the claims are within the scope of the present disclosure.

The present disclosure is useful as a vehicle control device used autonomous driving, for example, and including a plurality of IC units, while maintaining the operational reliability.

What is claimed is:

1. A vehicle control device comprising:
  a first integrated circuit (IC) unit for receiving an output from a camera mounted in a vehicle, performing image processing on the output from the camera, and outputting image data obtained through the image processing;
  a second IC unit for receiving the image data output from the first IC unit, performing recognition processing of an external environment of the vehicle based on the image data, and outputting external environment data obtained through the recognition processing; and
  a third IC unit for receiving the external environmental data output from the second IC unit, and performing judgment processing for cruise control of the vehicle based on the external environment data, wherein
  a control flow is provided so as to allow the third IC unit to transmit a control signal to each of the first and second IC units, the control flow including a first line from the third IC unit to the first IC unit and a second line from the third IC unit to the second IC unit, and
  the control flow is provided separately from a data flow configured to transmit the output from the camera, the image data output from the first IC unit, and the external environment data output from the second IC unit.

2. The vehicle control device of claim 1, wherein
  each of the first to third IC units includes a memory for storing a program for performing the processing, and
  each of the first and second IC units reads out the program from the memory according to the control signal received from the third IC unit through the control flow, and performs the processing.

3. The vehicle control device of claim 2, further comprising a non-volatile shared-memory for storing a program for performing the processing by the first to third IC units, and at boot time of the vehicle control device, the program for performing the processing by the first to third IC units is transmitted from the non-volatile shared-memory to the memory of each of the first to third IC units.

* * * * *